US006539616B1

(12) United States Patent
Nakahira et al.

(10) Patent No.: US 6,539,616 B1
(45) Date of Patent: Apr. 1, 2003

(54) TERMINAL TEMPORARY HOLDING JIG AND AN AUTOMATIC TERMINAL INSERTING APPARATUS

(75) Inventors: Shigeharu Nakahira, Yokkaichi (JP); Yoshinobu Ota, Yokkaichi (JP); Haruhito Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 343 days.

(21) Appl. No.: 09/619,433

(22) Filed: Jul. 19, 2000

(30) Foreign Application Priority Data

Jul. 22, 1999 (JP) .......................................... 11-207826

(51) Int. Cl.[7] ................................................ B23P 19/00
(52) U.S. Cl. ........................................... 29/739; 29/876
(58) Field of Search .......................... 29/739, 747, 748, 29/874, 876, 857; 439/733.1, 740, 743, 744

(56) References Cited

U.S. PATENT DOCUMENTS 5,355,593 A * 10/1994 Osumi et al. ................. 29/876
5,581,873 A 12/1996 Okura et al.
5,630,273 A 5/1997 Kobayashi et al.
5,683,257 A 11/1997 Kobayashi et al.
5,779,501 A * 7/1998 Hotra et al. ................ 438/595
6,067,710 A * 5/2000 Sakaoka et al. .............. 29/842
6,170,152 B1 * 1/2001 Ohta et al. ..................... 29/747

FOREIGN PATENT DOCUMENTS

EP 0 530 763 10/1993

* cited by examiner

*Primary Examiner*—David J. Walczak
(74) *Attorney, Agent, or Firm*—Gerald E. Hespos; Anthony J. Casella

(57) ABSTRACT

A terminal temporary holding jig (J) is provided for a later-inserted terminal (T). The terminal temporary holding jig (J) includes a terminal holder (1) secured to a base (B) of an automatic terminal inserting apparatus. A lid (2) is provided for opening and closing terminal insertion grooves (5) that extend in forward and backward directions in the terminal holder (1). The lid (2) can be attached magnetically in a closed condition on the terminal holder (1). A locking member (9) is provided in the lid (2) and includes a leaf spring with saw teeth that project obliquely backward into the terminal insertion grooves (5). A later-inserted terminal (T) can be inserted through a front end opening of the terminal insertion groove (5) in this state, and can be locked in the terminal insertion groove (5) by the engagement of a step "b" of the terminal (T) with the leading end of the locking member (9). The terminal (T) is taken out by rotating the base (B) into an inverted position, opening the lid (2) and pushing the terminal (T) and the wire (A) down together.

8 Claims, 6 Drawing Sheets

TERMINAL TEMPORARY HOLDING JIG AND AN AUTOMATIC TERMINAL INSERTING APPARATUS

BACKGROUND OF THE INVENTION

1. Field of the Invention

The present invention relates to a jig for temporarily holding a terminal, and, in particular, for temporarily holding, in a terminal inserting apparatus, a terminal that is to be inserted later when subassemblies that form a wiring harness are manufactured. Furthermore, the invention relates to such an automatic terminal inserting apparatus.

2. Description of the Related Art

A prior art automotive wiring harness is comprised of a multitude of wires. The wiring harness is manufactured by first forming subassemblies of a relatively smaller number of wires. The subassemblies then are combined to form the wiring harness.

The subassemblies may include terminals that are not inserted into connector housings until the terminals and the respective wires are formed into the wiring harness and/or other terminals that are connected with devices equipped in an automotive vehicle. Terminals of this type often are referred to as later-inserted terminals. If these later-inserted terminals are left hanging, the wires connected with the terminals may be entangled with other wires to hinder a later process or to deform the terminals themselves. Wire entanglement or terminal damage may preclude proper insertion of the terminals into the connector housing.

As a countermeasure, it may be considered prudent to use a temporary holding jig for temporarily holding a later-inserted terminal during the manufacturing of a subassembly in an automatic terminal inserting apparatus. Such a jig is disclosed, for example, in U.S. Pat. No. 5,630,273. However, the above-described jig requires the terminal and the wire to be slid along their longitudinal direction when the terminal is removed from the jig for transfer to a later process. This operation presents poor operability.

In view of this problem, an object of the present invention is to provide a terminal temporary holding jig and an automatic terminal inserting apparatus with which a later-inserted terminal can be held securely and from which the later-inserted terminal can be removed quickly.

SUMMARY OF THE INVENTION

According to the invention, there is provided a terminal temporary holding jig for an automatic terminal inserting apparatus. The temporary holding jig comprises a terminal holder, which is to be secured to a base of the automatic terminal inserting apparatus. At least one terminal insertion groove is formed in the terminal holder for at least partially accommodating at least one terminal that is to be inserted into the terminal insertion groove. A lid is provided for at least partly opening and closing the terminal insertion groove and a locking member is provided in or on the lid. The locking member projects at least partly into the terminal insertion groove when the lid is substantially closed to hold or lock the terminal in the terminal insertion groove.

According to a preferred embodiment, the locking member extends obliquely backward into the terminal insertion groove when the lid is in its substantially closed position.

Preferably, the leading end of the locking member can engage a step of a terminal that is inserted through a front-end opening of the terminal insertion groove when the lid is substantially closed.

According to a further preferred embodiment, a terminal temporary holding jig is provided in or for an automatic terminal inserting apparatus. The terminal temporary holding jig comprises a terminal holder secured to a base of the automatic terminal inserting apparatus. Terminal insertion grooves are formed in the terminal holder and extend in forward and backward directions. A lid is provided for opening and closing the terminal insertion grooves, and a locking member is provided in the lid. The terminal holder holds the lid in its closed condition with the locking member of the lid projecting obliquely backward into the terminal insertion grooves. Additionally, the leading end of the locking member engages a step of a terminal that is inserted through a front-end opening of the terminal insertion groove while the lid is substantially in its closed position. The locking member securely holds the later-inserted terminal in the terminal insertion groove, and prevents the terminal from coming out.

The terminal can be taken out of the terminal insertion groove easily by opening the lid, inverting the base to hold the temporary holding jig upside down and then pushing down on the terminal together with the wire.

A magnetic portion may be provided on one of the base plate and the lid and a magnetically attachable portion may be provided on the other of the base plate and the lid. The interaction of the magnetic portion and the magnetically attachable portion may hold the lid in its substantially closed condition, and accordingly, the lid can be opened and closed easily.

Preferably, the lid is mounted on the base plate for pivotal or rotational movement.

Most preferably, the locking member comprises a leaf spring with a plurality of saw teeth. Each saw tooth preferably extends at least partly into a corresponding terminal insertion groove.

According to the invention, there is further provided an automatic terminal inserting apparatus for mounting subassemblies of a wiring harness by at least partly inserting terminals into corresponding connectors and pulling the terminals for verifying that they are properly inserted or locked. The apparatus comprises at least one terminal temporary holding jig as described herein.

According to a preferred embodiment, the terminal temporary holding jigs are provided on or in a frame of the automatic terminal inserting apparatus and can pivot or rotate around the longitudinal direction of a base of the frame.

Preferably, the automatic terminal inserting apparatus further comprises at least one stopper. The stopper interacts with the lid to pivot or otherwise move the lid from its open position substantially to its closed position when the terminal temporary holding jig is rotated or pivoted.

These and other objects, features and advantages of the present invention will become apparent upon a reading of the following detailed description and accompanying drawings.

DETAILED DESCRIPTION OF THE PREFERRED EMBODIMENTS

A terminal temporary holding jig in accordance with the invention is identified generally by the letter J in FIGS. 1–7. The temporary holding jig J is mounted on a base B of an automatic terminal inserting apparatus, and is used for temporarily holding a later-inserted terminal T. In this context, the term later-inserted terminal T identifies a terminal that is not inserted into a connector housing C at the time a subassembly V is formed. The subassembly V is formed at one side of the base B and is taken out at the other side of the base B by or after the rotation or pivotal movement of the base B. A next set of connector housings C then are set in the base B. The automatic terminal inserting apparatus inserts terminals T into a temporary holding jig J and preferably pulls the terminal T so as to verify that the terminal T is held firmly or properly inserted into the temporary holding jig J and/or to verify that a holding member 9 (to be described later) is functioning properly.

Figure 1:
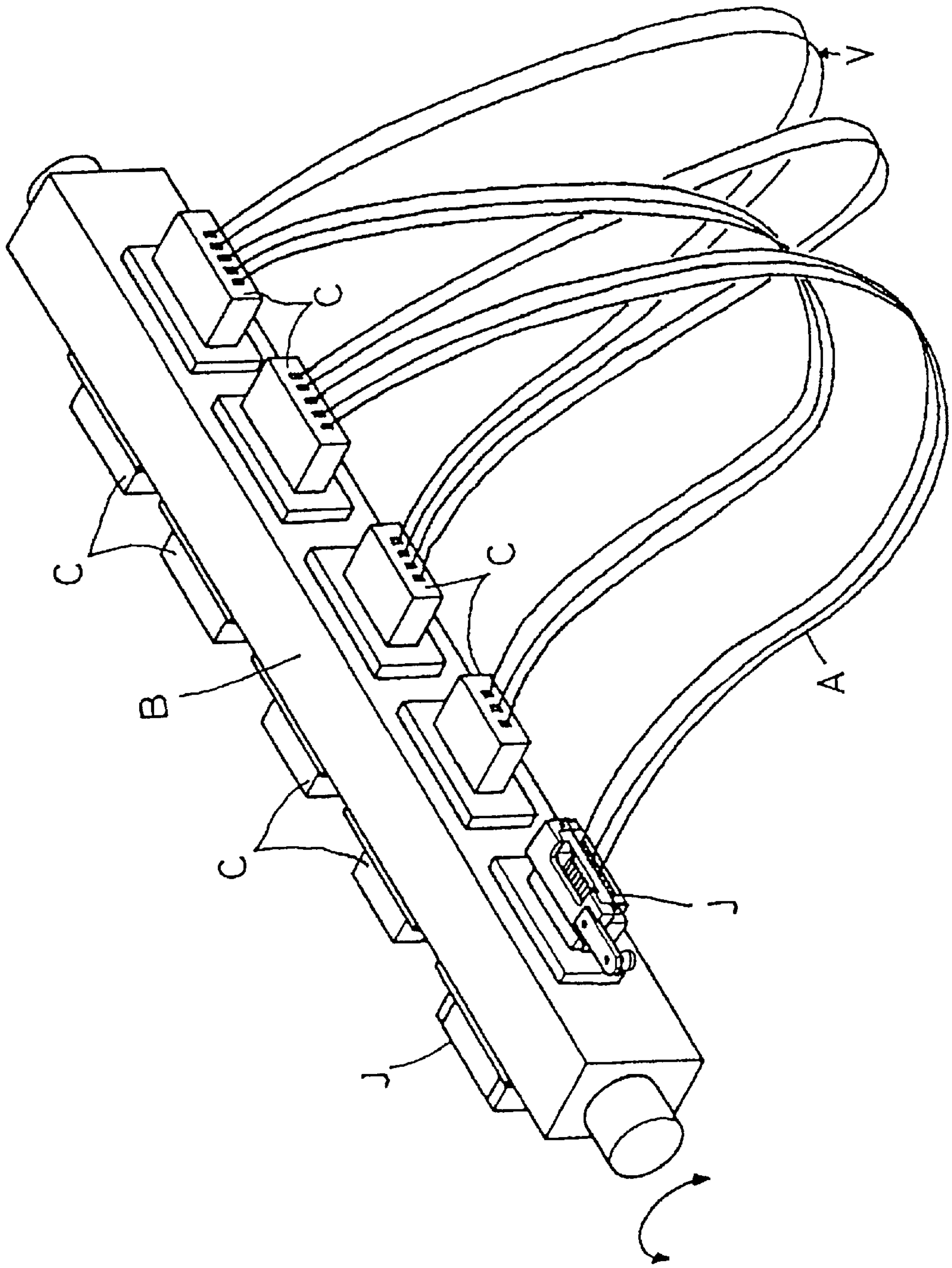
FIG. 1 is a perspective view showing a used state of a terminal temporary holding jig according to a preferred embodiment of the invention.
Figure 2:
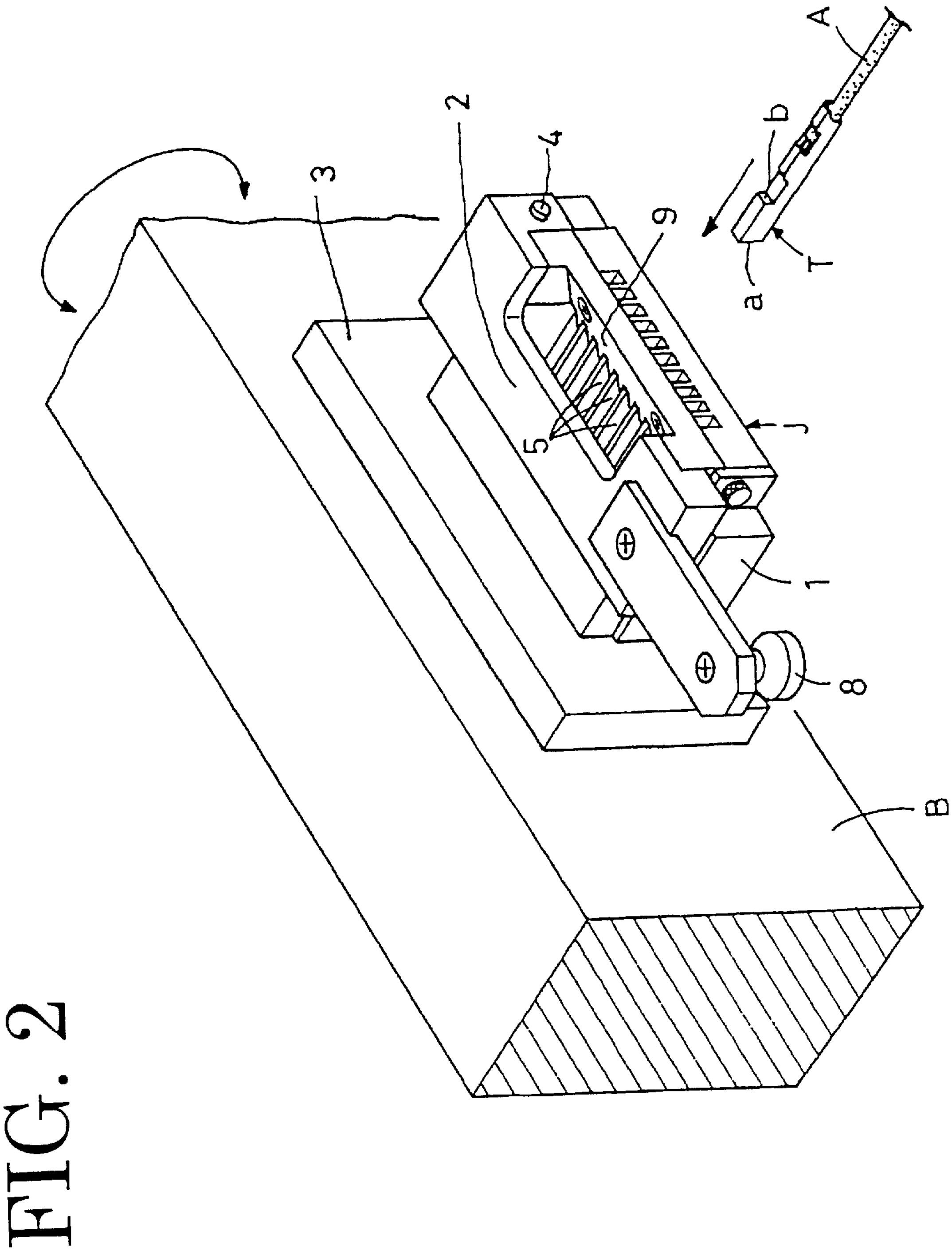
FIG. 2 is a perspective view showing the holding jig with a lid substantially closed.
Figure 3:
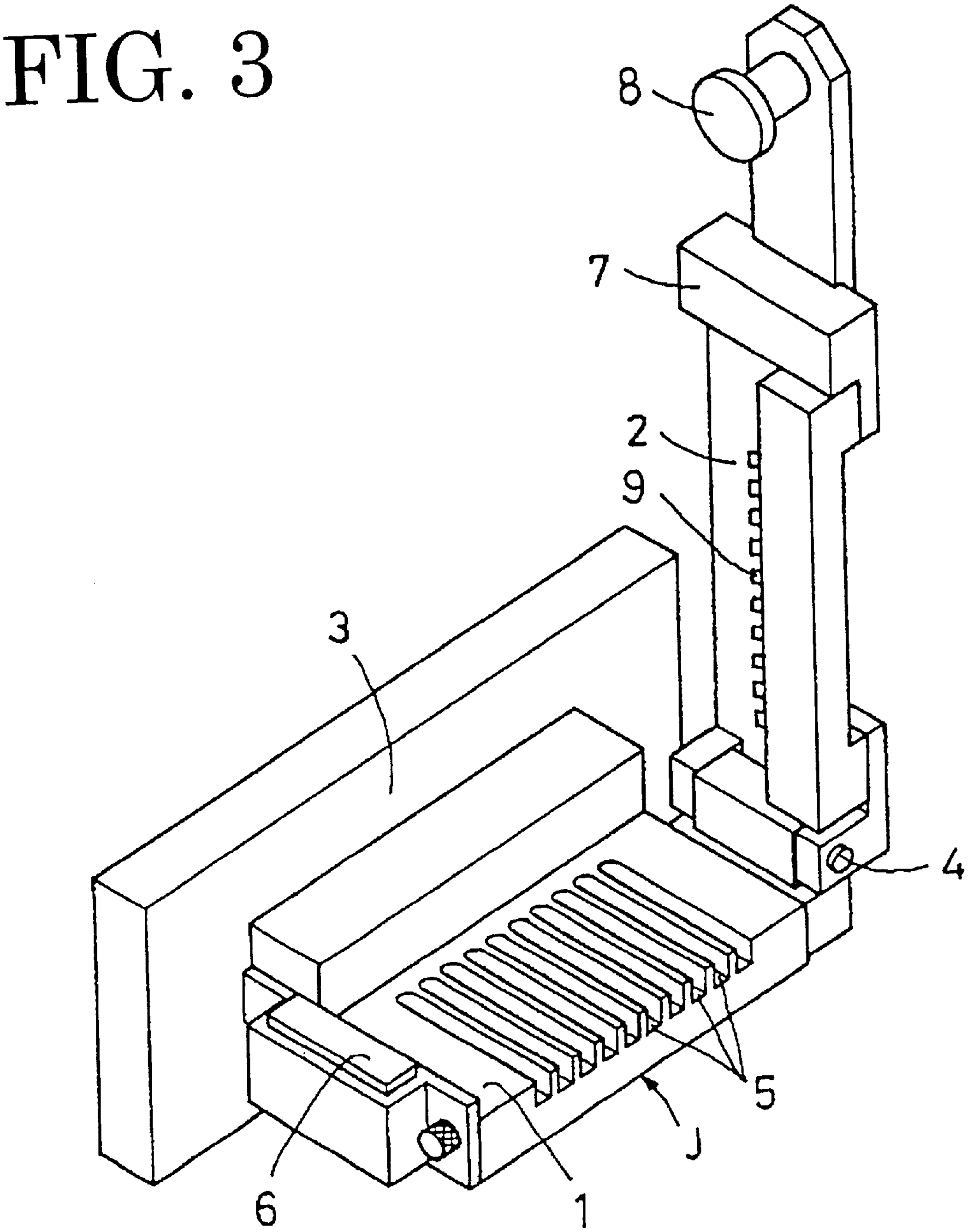
FIG. 3 is a perspective view showing the holding jig with the lid substantially opened.
Figure 4:
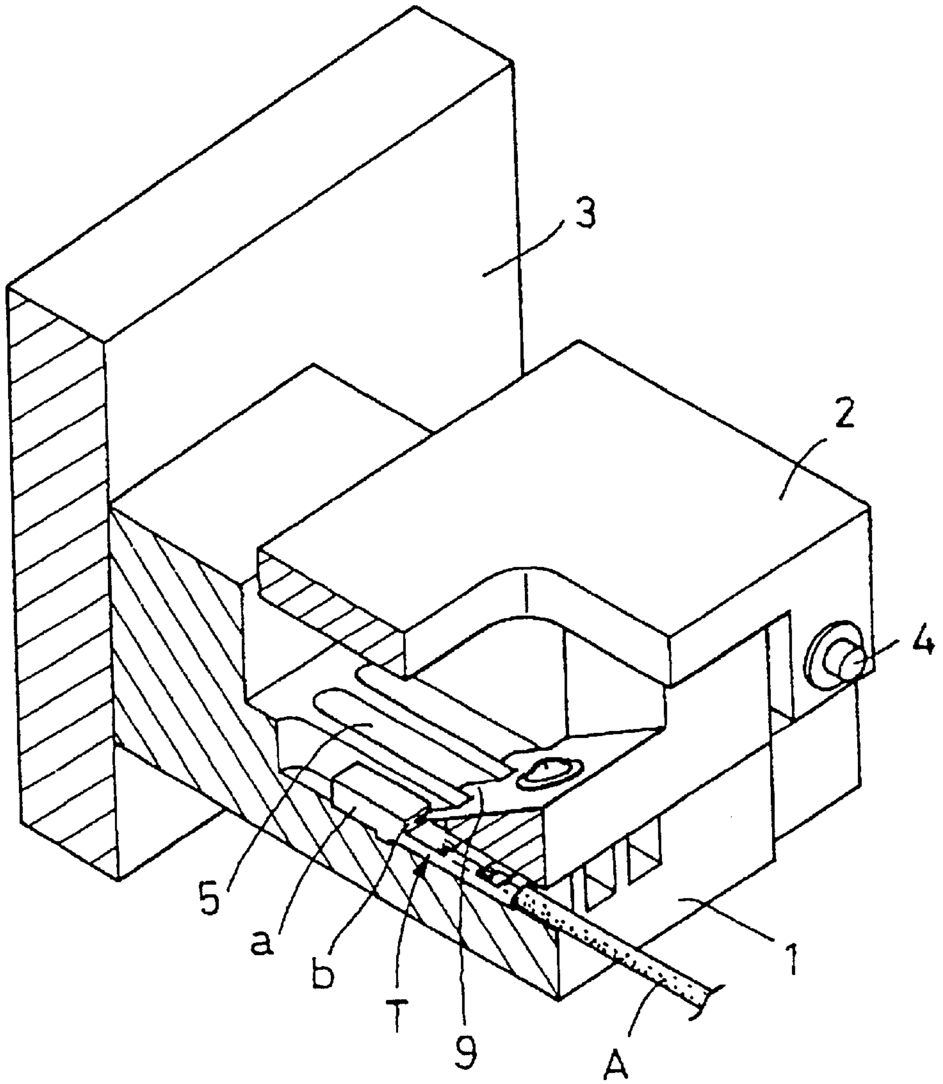
FIG. 4 is a perspective view partly in section showing a portion of the holding jig.
Figure 5:
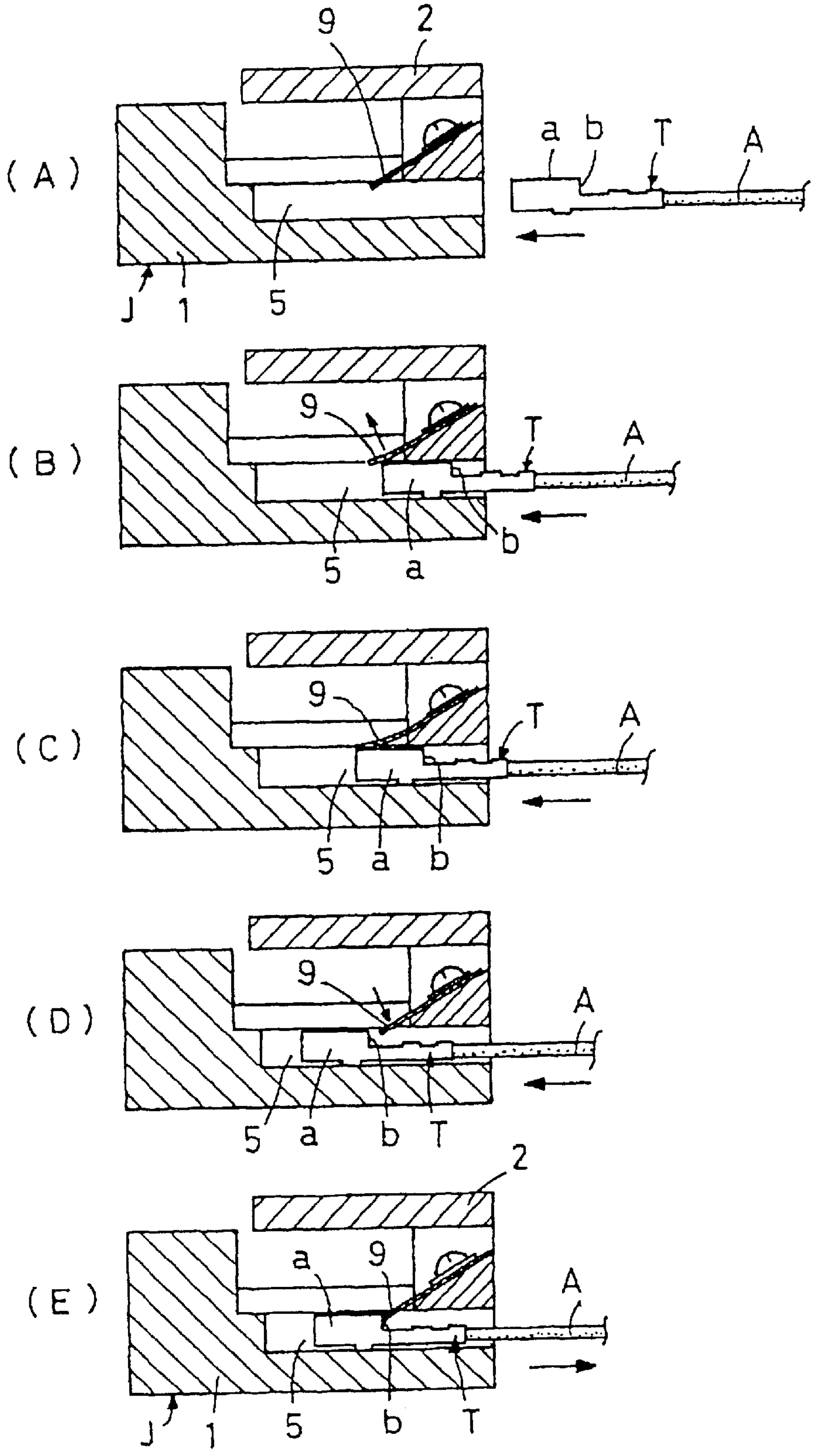
FIGS. 5(A) to 5(E) are vertical sections showing a process of inserting a terminal into a terminal insertion groove of the holding jig.

The holding jig J, as shown in FIGS. 2 to 4, is comprised of a terminal holder 1 and a lid 2. The terminal holder 1 is secured to the base B via a base plate 3, and the lid 2 is coupled pivotally to one side of the terminal holder 1 via a pin 4. A multitude of terminal insertion grooves 5 extend in forward and backward directions or along an insertion direction of the terminals T and are arrayed substantially side by in the terminal holder 1. The terminal insertion grooves 5 are closed and opened at least partly as the lid 2 is pivoted between a first position (FIG. 2) and a second position (FIG. 3), respectively. The front end of the terminal insertion grooves 5 are substantially open in the front surface of the terminal holder 1.

A magnet 6 is mounted on the side of the terminal holder 1 opposite the pivot pin 4, and a magnetically attachable portion 7 and a grip 8 are provided at the end of the lid 2 opposite the pivot pin 4. Further, a locking member 9 is mounted on the lid 2. The locking member 9 preferably is made of a leaf spring with saw teeth that extend toward the backside of the terminal holder 1. The lid 2 can be held in its closed position and attached to the terminal holder 1 by the attraction between the magnetically attachable portion 7 and the magnet 6. In this closed position, the saw teeth of the locking member 9 project obliquely backward into the terminal insertion grooves 5.

The subassembly V can be manufactured using the holding jig J by initially inserting the terminal T through the front end opening of the terminal insertion groove 5, as shown in FIG. 5(A). This insertion of the terminal T into the terminal insertion groove 5 causes the locking member to warp or bend or deflect upward or away from the terminal insertion groove 5, as shown in FIGS. 5(B) and 5(C). Sufficient insertion causes a tubular portion "a" at the leading end of the terminal T to pass the locking member 9. The locking member 9 then is restored elastically substantially to its original state as shown in FIG. 5(D). If the terminal T is pulled in this state as shown in FIG. 5(E), the leading end of the locking member 9 engages a step "b" of the terminal T to prevent the terminal T from coming out of the terminal insertion groove 5. Therefore, the terminal T is held without hanging.

Figure 6:
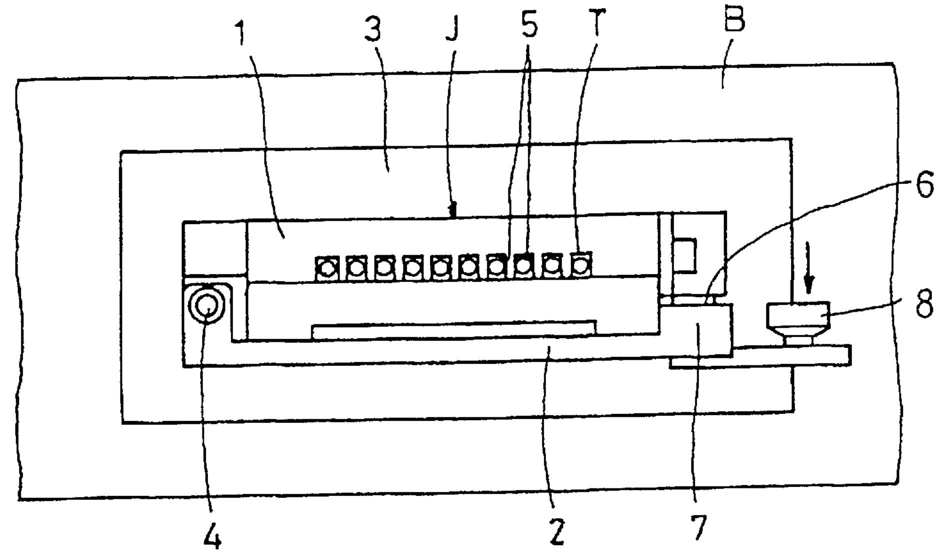
FIG. 6 is a front view of the holding jig inverted upside down.

The base B is rotated upon completion of the subassembly V to invert the holding jig J, as shown in FIG. 6. At this time, the lid 2 is attached to the terminal holder 1 by the force of the magnet 6, and is not opened by the action of gravity.

Figure 7:
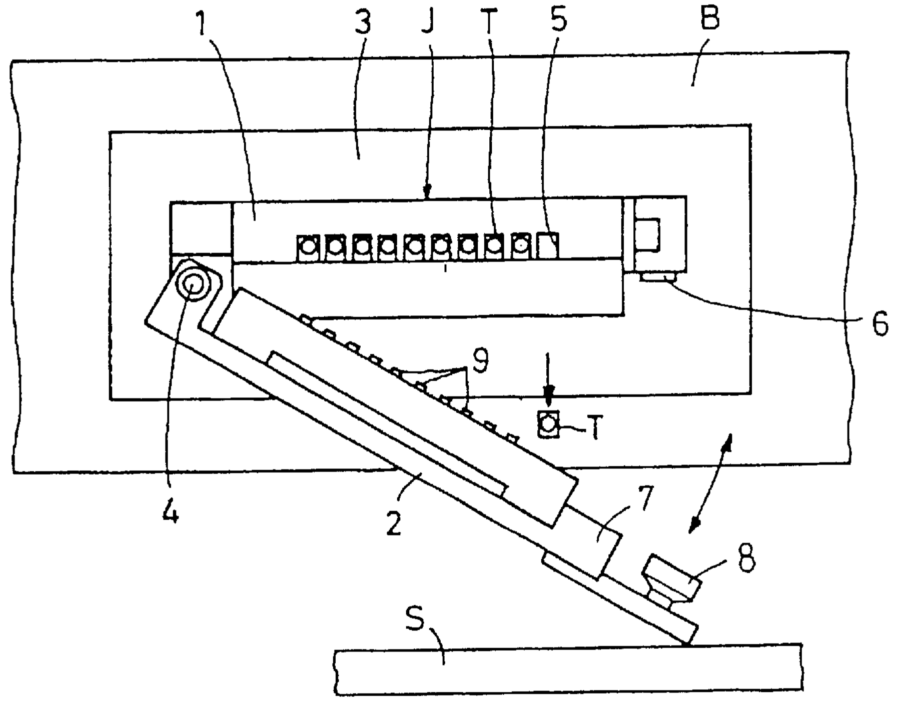
FIG. 7 is a front view showing how the terminal is taken out from the holding jig.

The terminal T is taken out of the holding jig J before being transferred to a subsequent stage of the manufacturing process. More particularly, the terminal T is taken out from the holding jig J by pushing the grip 8 down and disengaging the magnetically attachable portion 7 from the magnet 6 to open the lid 2. The terminal T and the wire A then are pushed down together down, as shown in FIG. 7. The terminal T can be taken out from the holding jig J easily by such an operation.

The lid 2 needs to be closed after the terminal is taken out from the holding jig J to enable a succeeding terminal inserting operation. However the lid 2 may be left open inadvertently. In view of this possibility, a stopper S is located below the base B. The stopper S is disposed to engage the leading end of the lid 2, and to limit the amount of pivotal movement of the lid 2 away from the terminal holder 1. Thus, the lid 2 is closed by the action of gravity when the holding jig J is returned to its erect position by the rotation of the base B. Therefore, a reduction in operability due to an operation error can be prevented.

As described above, the later-inserted terminal is held securely in the temporary holding jig merely by inserting the terminal sufficiently into the terminal insertion groove for the locking member to engage the terminal. Consequently, damage to the later-inserted terminal and entanglement of the wires can be prevented.

Further, the terminal and the wire can be taken out easily merely by rotating the base to invert the holding jig, opening lid and pushing down on the terminal and the wire together. Therefore, operability can be improved.

What is claimed is:

1. A terminal temporary holding jig for an automatic terminal inserting apparatus, comprising:

a terminal holder which is to be secured to a base of the automatic terminal inserting apparatus, the terminal holder having an end and a plurality of outer side surfaces extending from the end;

at least one terminal insertion groove formed in one of said outer side surfaces of the terminal holder and extending from the end of the terminal holder for at least partially accommodating at least one terminal;

a lid releasably engaged with the outer side surface of the terminal holder that has the terminal insertion groove for at least partly opening and closing the terminal insertion groove; and a locking member provided in the lid, the locking member being configured to project at least partly into the terminal insertion groove when the lid is closed for holding the terminal in the terminal insertion groove.

2. A terminal temporary holding jig according to claim 1, wherein the locking member extends obliquely backward into the terminal insertion groove when the lid is substantially in its closed position.

3. A terminal temporary holding jig according to claim 1, wherein the terminal includes a step, and wherein the terminal insertion groove includes a front end opening configured to receive the terminal when the lid is substantially closed, the leading end of the locking member being configured to engage the step of the terminal inserted through the front end opening of the terminal insertion groove.

4. A terminal temporary holding jig for an automatic terminal inserting apparatus, comprising:

a terminal holder which is to be secured to a base of the automatic terminal inserting apparatus;

at least one terminal insertion groove formed in the terminal holder for at least partially accommodating at least one terminal;

a lid for at least partly opening and closing the terminal insertion groove;

a locking member provided in the lid, the locking member being configured to project at least partly into the terminal insertion groove when the lid is closed for holding the terminal in the terminal insertion groove; and wherein the terminal holder is mounted to a base plate, a magnetic portion being provided on one of the terminal holder and the lid, and a magnetically attachable portion being provided on the other of the terminal holder and the lid, the lid being fixed substantially in its closed position by the interaction of the magnetic portion and the magnetically attachable portion.

5. A terminal temporary holding jig for an automatic terminal inserting apparatus, comprising:

a terminal holder which is to be secured to a base of the automatic terminal inserting apparatus;

at least one terminal insertion groove formed in the terminal holder for at least partially accommodating at least one terminal;

a lid for at least partly opening and closing the terminal insertion groove, wherein the lid is mounted pivotally on the terminal holder; and a locking member provided in the lid, the locking member being configured to project at least partly into the terminal insertion groove when the lid is closed for holding the terminal in the terminal insertion groove.

6. A terminal temporary holding jig according to claim 1, wherein the locking member comprises a leaf spring with saw teeth, each saw tooth extending at least partly into a corresponding terminal insertion groove.

7. An automatic terminal inserting apparatus for mounting subassemblies forming a wiring harness by at least partly inserting terminals into corresponding connector housings and pulling the terminals for verifying that they are properly inserted, comprising;

a base having a longitudinal axis and being pivotal about the axis, the connector housings being mounted to the base for permitting the inserting of the terminals into the corresponding connector housings; and at least one terminal temporary holding jig mounted on a frame of the automatic terminal inserting apparatus so as to rotate with the base around the longitudinal axis, the terminal temporary holding jig comprising a terminal holder which is to be secured to the base of the automatic terminal inserting apparatus, at least one terminal insertion groove formed in the terminal holder for at least partially accommodating at least one terminal, a lid for at least partly opening and closing the terminal insertion groove, and a locking member provided in the lid, the locking member being configured to project at least partly into the terminal insertion groove when the lid is closed for holding the terminal in the terminal insertion groove.

8. An automatic terminal inserting apparatus according to claim 7, further comprising at least one stopper, the stopper being disposed to contact the lid when the lid is substantially in its open position for limiting pivoting movement of the lid relative to the terminal holder, wherein, when the terminal temporary holding jig is rotated with the base, the lid that is substantially in its open position is moved substantially to its closed position by an interaction with the stopper.

* * * * *